Inventors:
Fred C. Haberland
and Eugene A. Moore
By: Joseph R. Dwyer
Atty.

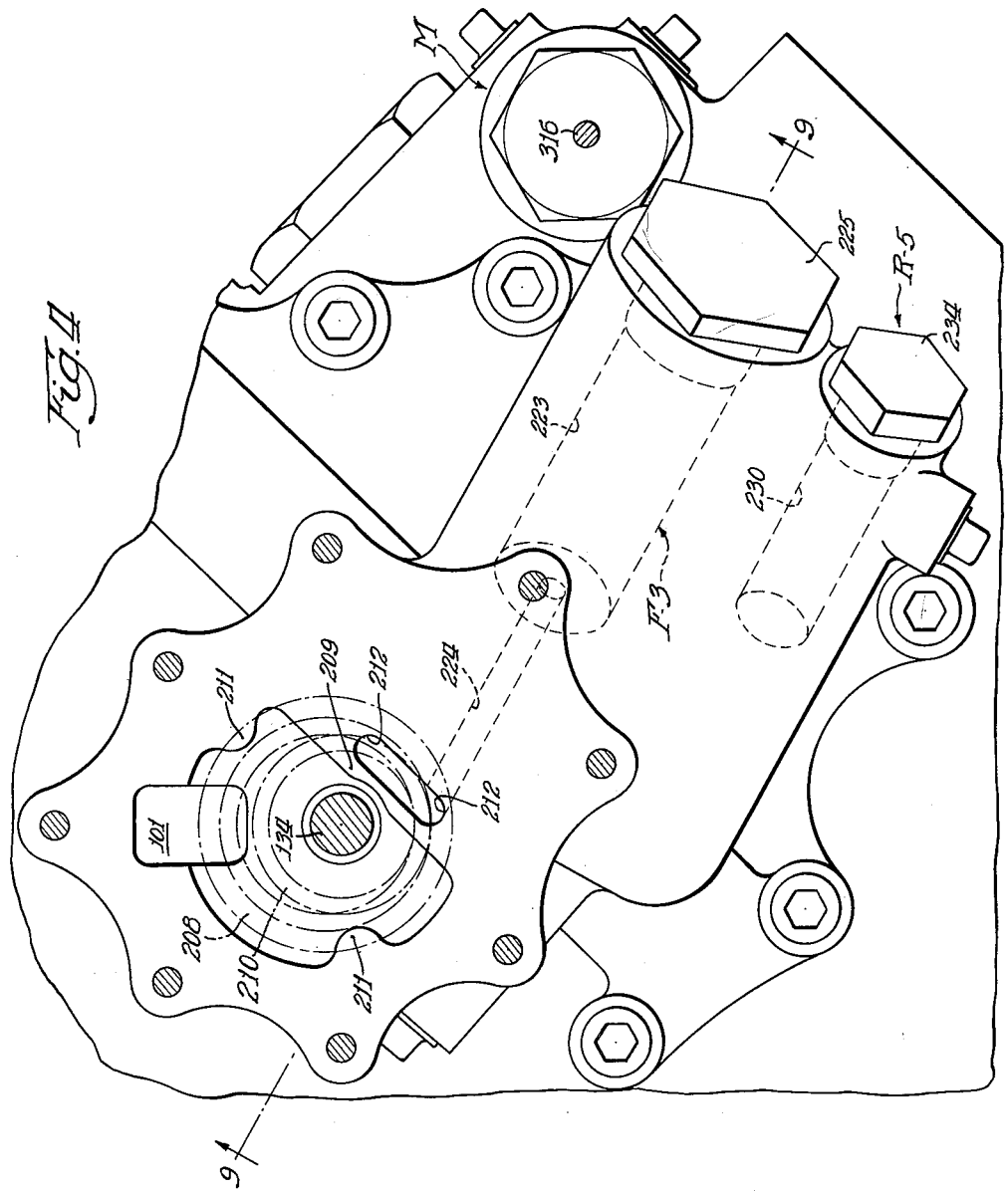

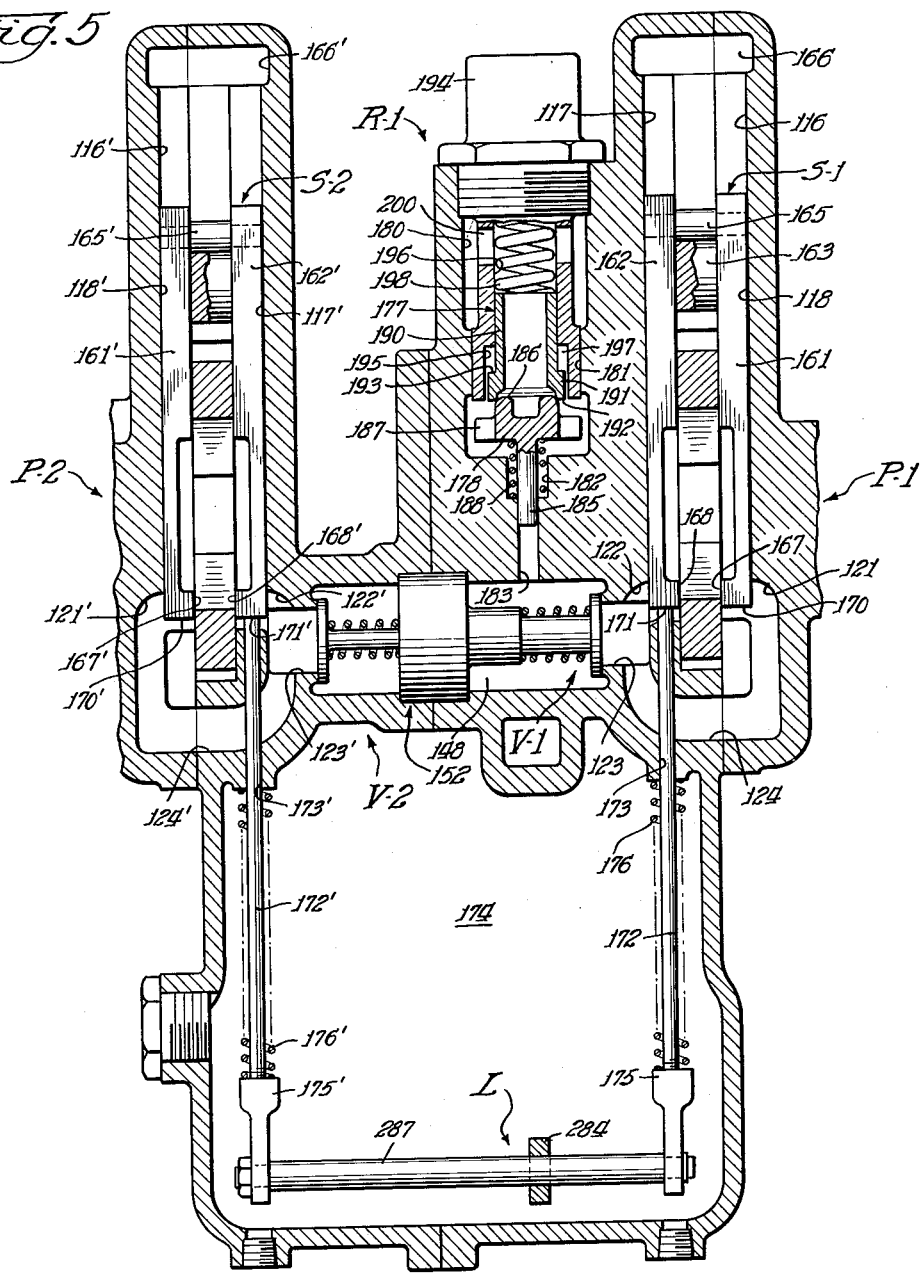

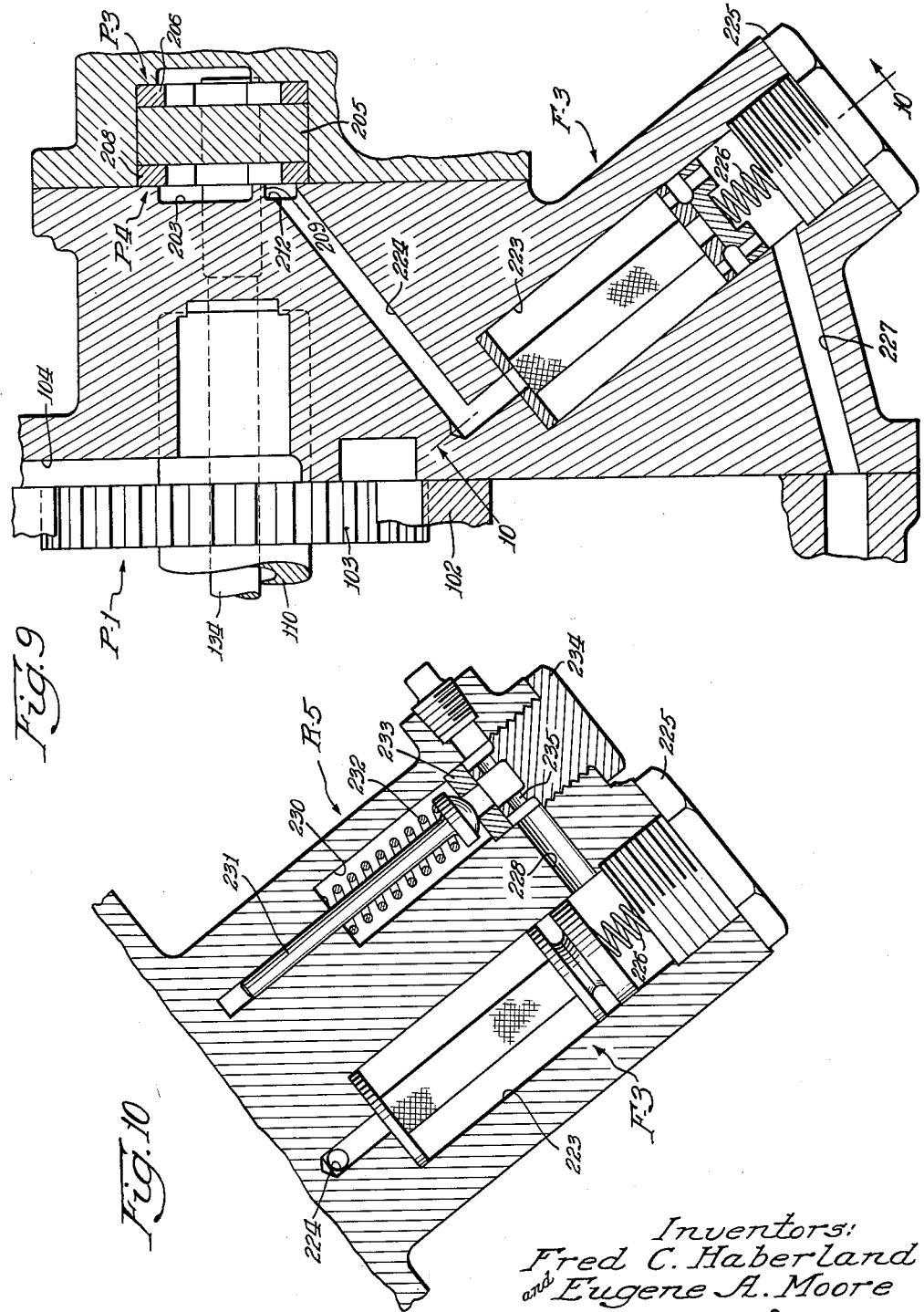

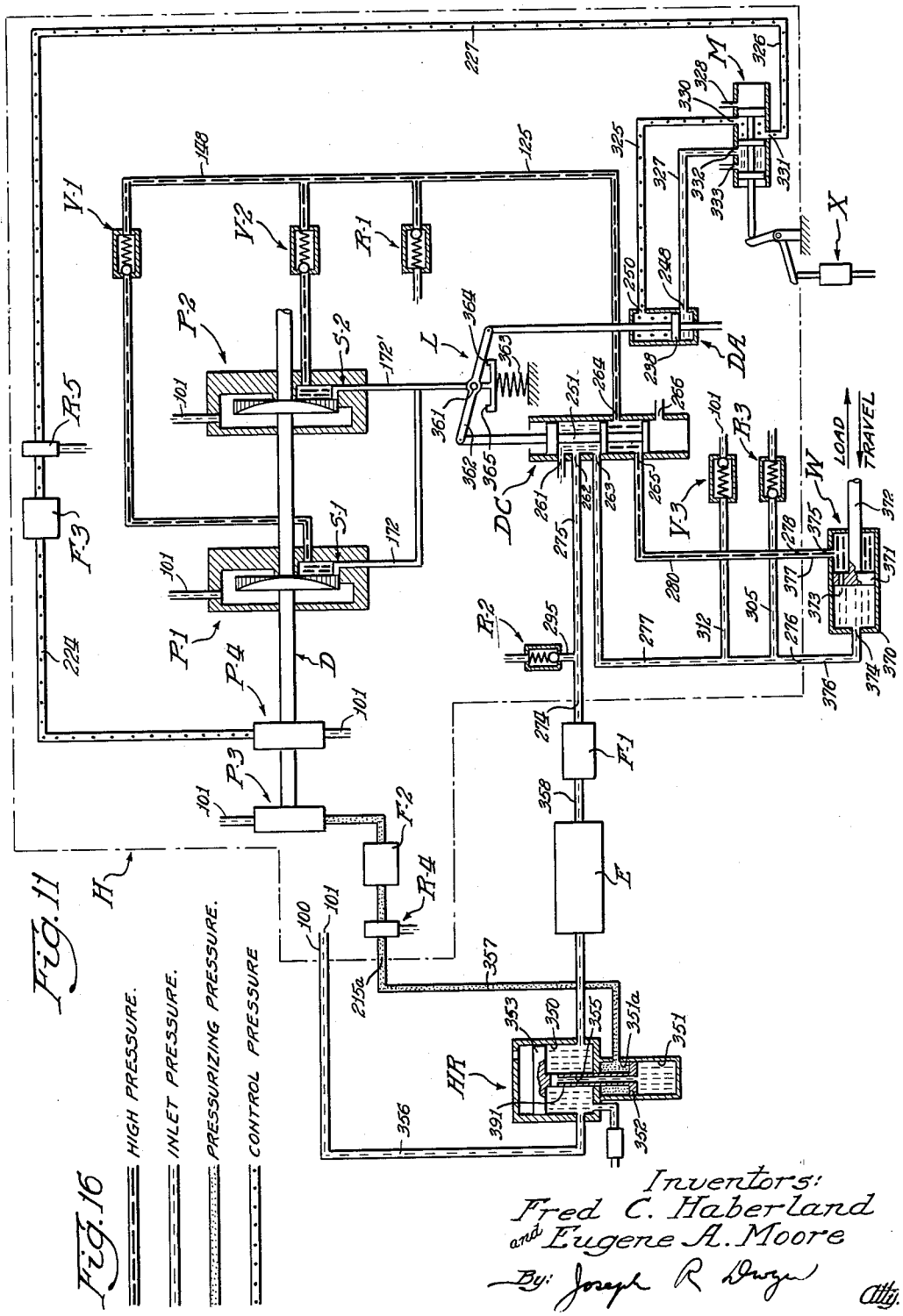

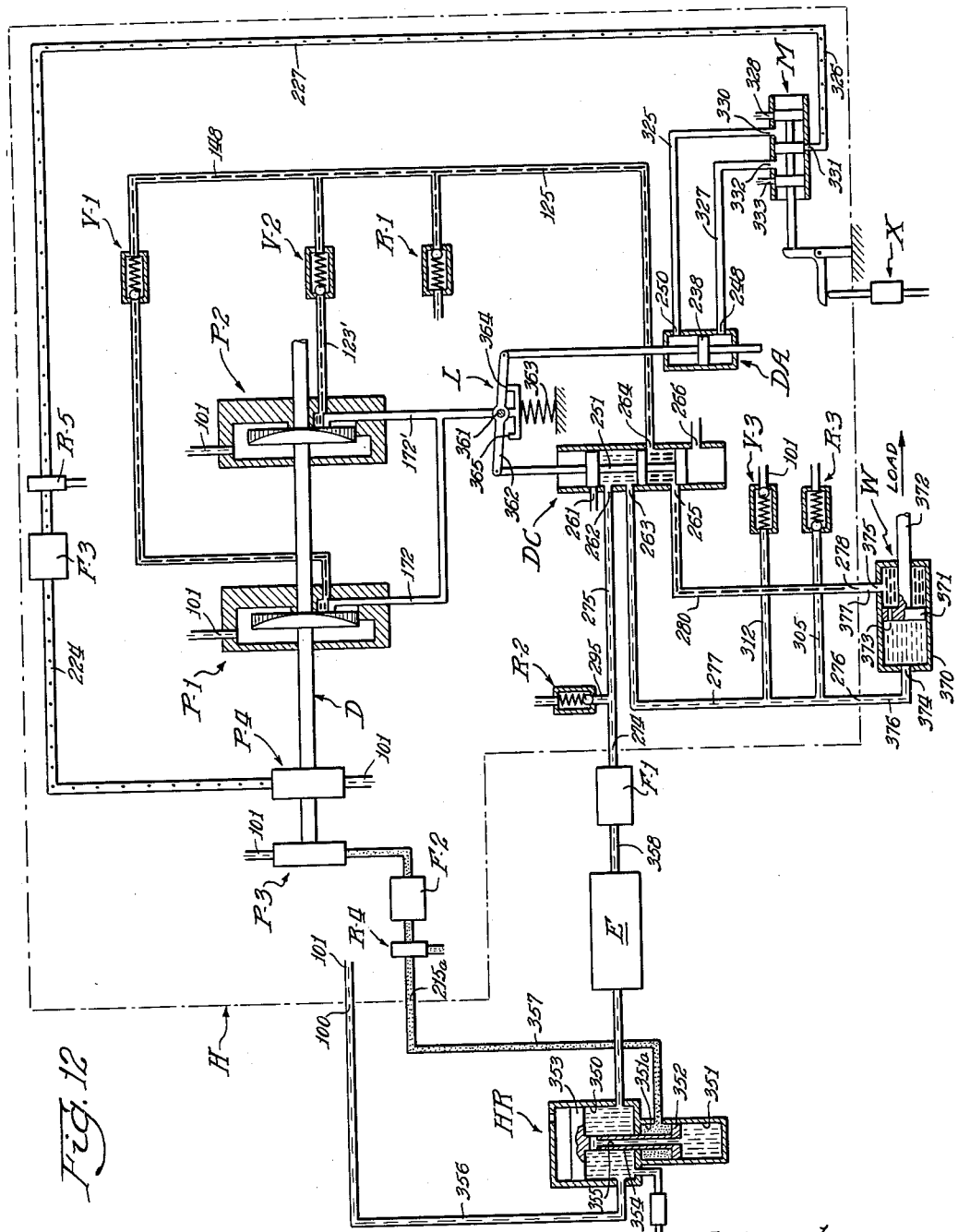

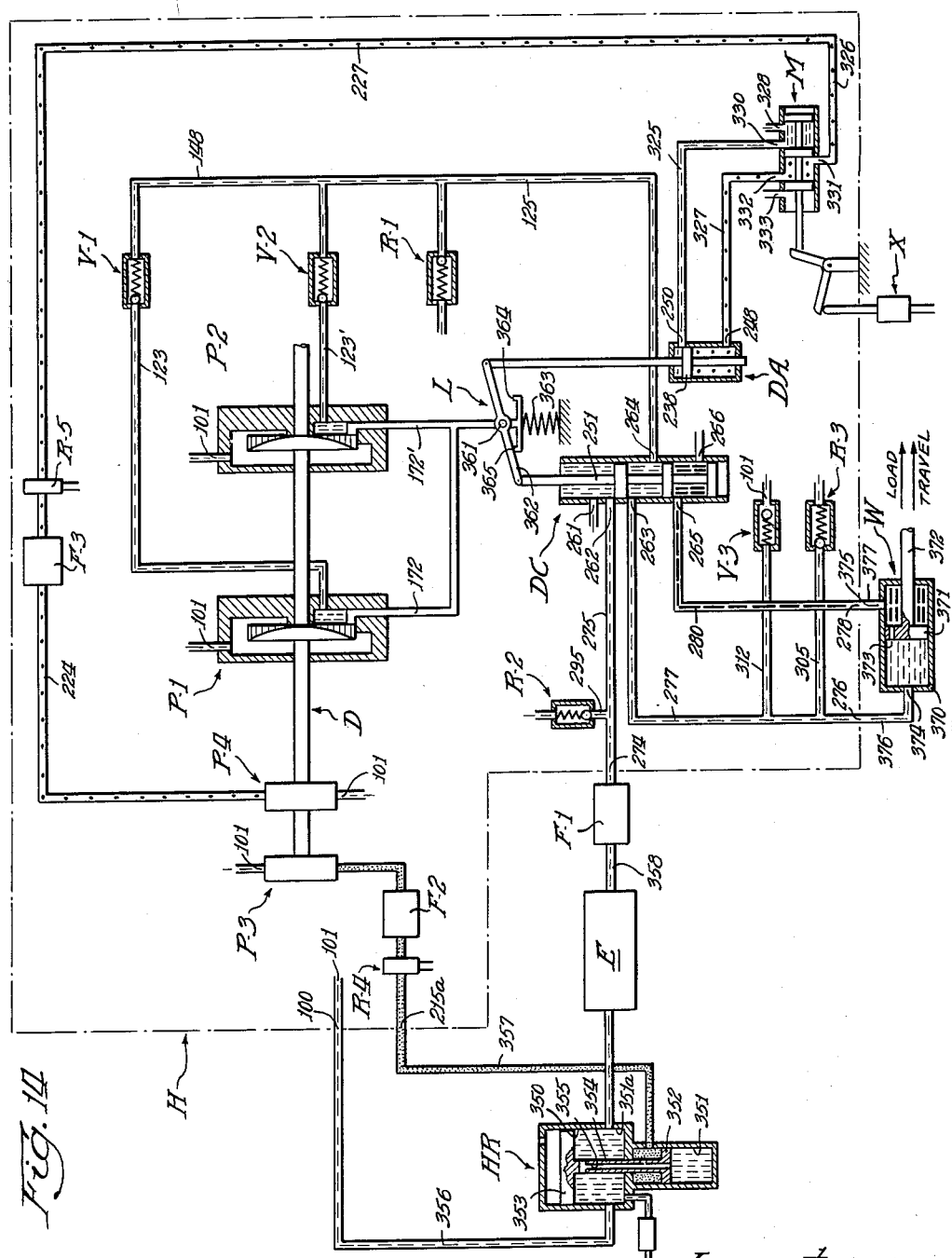

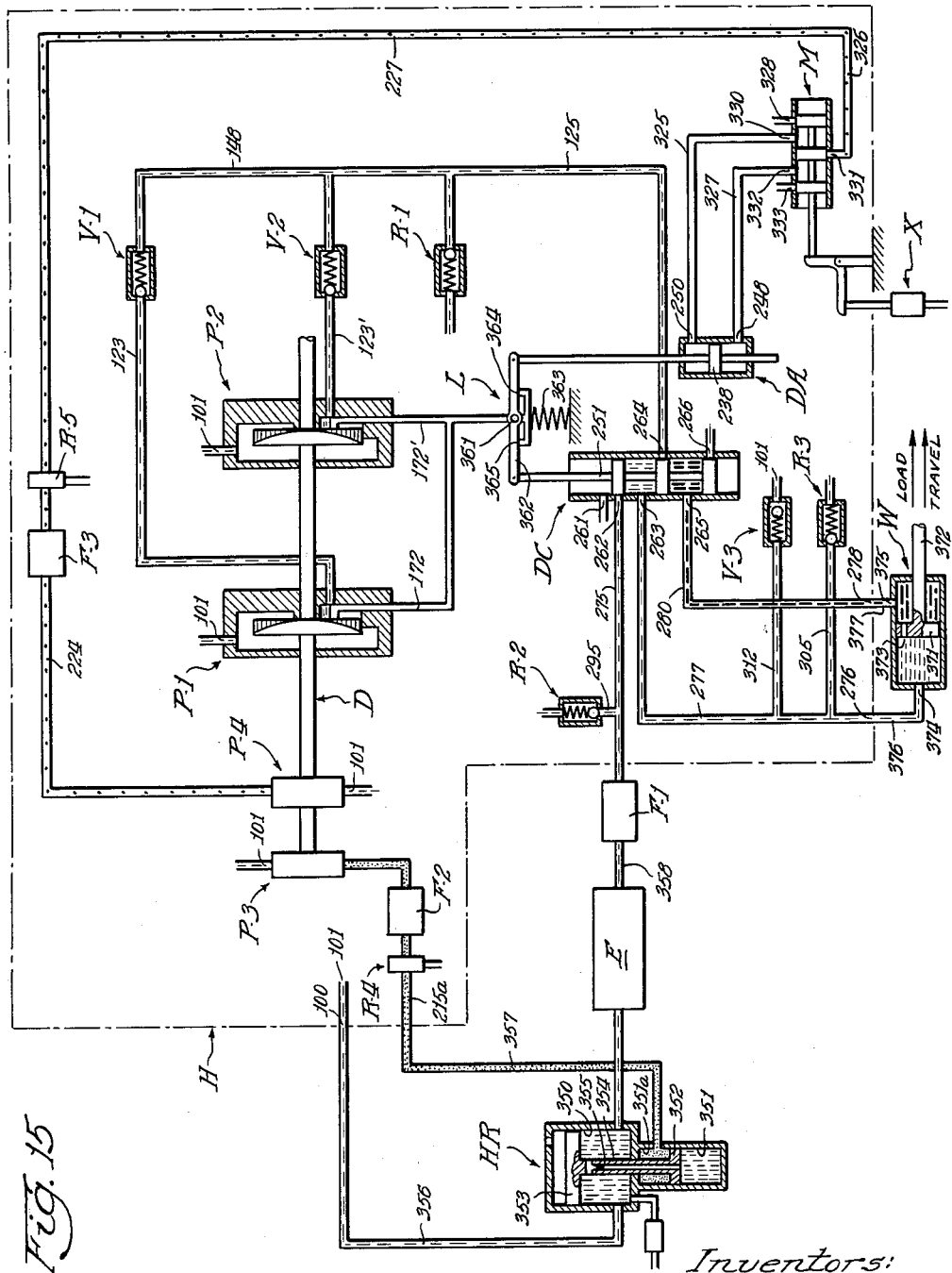

United States Patent Office 2,979,902
Patented Apr. 18, 1961

2,979,902

JET ENGINE NOZZLE AREA CONTROL SYSTEM

Fred C. Haberland, Cleveland, and Eugene A. Moore, Bedford Heights, Ohio, assignors to Borg-Warner Corporation, Chicago, Ill., a corporation of Illinois Filed Feb. 19, 1957, Ser. No. 641,198

3 Claims. (Cl. 60—52)

This application relates in general to fluid pressure and flow systems, and is particularly related to a fluid pressure and flow system adapted to operate a connected device, the operation of which is subject to several variables. More specifically, our invention is particularly useful in controlling the nozzle area of a jet engine by movement of nozzle cone segments, the required nozzle area of which is determined by several external variables, such as by the engine throttle temperature, the speed of the aircraft and/or the engine pressure; these determining variables being reflected in a control loop adapted to send a signal to the system for actuation thereof. We have accomplished the controlling of the nozzle area in a system which is self-compensating for any variations in load, and internal variables such as variations in temperature and/or leakage in the system itself, and changes in pump volumetric efficiencies.

There are a number of nozzle area control systems in use incorporating, for example, a variable displacement pump and one or more follow-up valves cooperating with a piston motor connected with the nozzle segments. Theoretically, any change in the position of the motor piston will be communicated to the follow-up valves which in turn communicate with the variable displacement pump, so as to vary the displacement thereof and therefore the quantity of fluid delivered to the system. Such systems are deficient for several reasons, for example, no provisions are made for internal variations in the system such as variations in the load on the motor, for variations in the fluid temperature causing leakage in the motor, nor for compensating for changes in the flow to the load actuating means.

Accordingly, a general object of our invention is to provide a new and improved flow and pressure system, and one overcoming the deficiencies of prior art systems by being self-compensating for variations in the load, and internal variables such as variations in temperature and leakage in the system, and changes in pump volumetric efficiencies.

We propose to accomplish this feature and object by a provision of a system including a pump assembly having a pair of variable displacement pumps driven in tandem and discharging in parallel into a common outlet. The common outlet is in communication with a directional control valve having a slidable spool type valve proper in communication with both sides of a movable area control or load piston means slidably disposed within a cylinder, the latter piston and cylinder assembly being mechanically connected to nozzle area segments forming part of the load, so that movement of the load piston results in a corresponding change of nozzle area by a change of position of the nozzle cone segments. The directional control valve is mechanically coupled to a displacement control actuator, and both the valve and the actuator are mechanically coupled by linkage means to pump displacement control means, the positions of which determine the displacement of the pumps. The displacement control actuator is hydraulically coupled to a monitoring valve actuated by a mechanical input signal connected to the control loop in which the aforementioned variables are reflected. Thus, according to the signal received from the control loop, the monitoring valve is displaced from a null position, and through the cooperation of the displacement control actuator and the directional control valve, the amount and direction of flow to the area control or load cylinder is accordingly varied. Any variation in the amount of flow to and from the control or load cylinder because of such internal variables as leakage, or temperature changes, or otherwise in the system itself is immediately compensated for by the interrelationship between the control loop and the flow to the load cylinder. This compensation is accomplished by the fact that any internal variation in this system or any variation in the load which would cause a drift of the load piston from its desired position, or a drift from a desired rate of movement of the load, as the case may be, will be indicated by some unbalance in the control loop. This unbalance of the control loop in our system will cause a change in pump displacement to bring the control loop back into balance, i.e., the system's desired operation condition, sometimes hereinafter referred to as the null position or condition of the system. In the aforementioned prior art systems any internal change or the like in the system causing drift will be stopped but due to independence of these internal variations from the control loop, the system will not be returned to its desired operating condition, so that the control loop will remain unbalanced and must be reset. This self-compensating feature of our invention is one of the important distinguishing characteristics over the prior art systems.

It is pointed out here, also, that in addition to the self-compensation feature of our system, we have provided a system which will be in balance with its control loop whether or not the control loop indicates that the work loading piston is required to remain stationary or is required to move at some predetermined rate. For example, it is possible under climbing conditions in a jet aircraft that the throttle position remain stationary but to climb at a predetermined rate the nozzle cone segments change their position. Under this condition, our system will be in balance during the continuous change of position of the nozzle cone segments and will become momentarily unbalanced only when the control loop indicates that our system must seek another null position because the conditions require the nozzle cone segments to become stationary. Our system will cause the nozzle cone segments to remain in this stationary position until it again receives a signal from the control loop.

These and other objects and features of our invention will become apparent from the following description when taken with the accompanying drawings, in which:

Figure 2A is a sectional view taken on line 2A—2A of Figure 2;

Figure 4 is a view taken on line 4—4 of Figure 1;

Figure 5 is a partial sectional view taken on line 5—5 of Figure 2;

Figure 6 is an enlarged partial sectional view taken on line 6—6 of Figure 2 and illustrating to advantage the monitoring valve;

Figure 9 is a partial sectional view taken on line 9—9 of Figure 4;

Figure 10 is a partial sectional view taken on line 10—10 of Figure 9;

Figure 13:
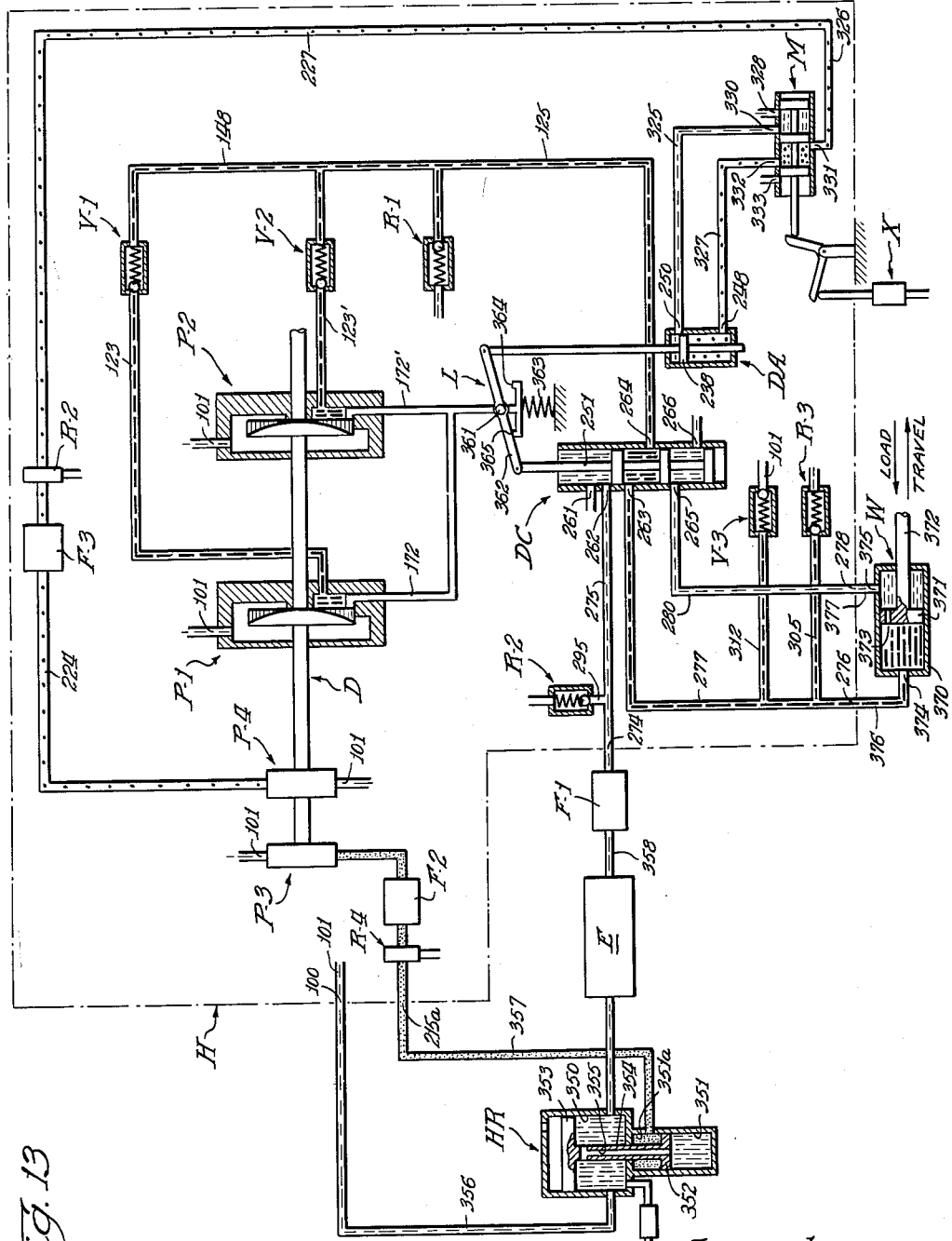

Figure 11 is a schematic drawing showing to advantage the hydraulic system incorporating our pumping assembly coupled on one side to a hydraulic reservoir and on the other side to the hydraulic utilization mechanism in the form of a loading piston and mechanically coupled to the mechanical input signal means. In this figure the direction of travel of the loading piston is to the left and there is indicated by appropriate legends the various pressures in the system;

Figure 12 is a schematic drawing similar to that of Figure 11 but having different elements subject to different pressures in order that the loading piston may be held immovable;

Figure 13 is a schematic drawing similar to Figures 11, 12 and 13 but showing different elements under different pressures than those in the other schematic figures and where the loading piston may be moved to the right but the load thereon is reversed from that shown in Figures 11, 12 and 13;

Figure 14 is a schematic drawing similar to Figure 11 but showing different elements under different pressures from either Figures 11 or 12 in order that the loading piston may move to the right;

Figure 15 is a schematic drawing similar to Figures 11, 12, 13 and 14 but showing our system wherein a slow and slight change in the position of the area control piston is necessary; and Figure 16 provides a legend for identification of the various pressures in the system shown schematically in Figures 11, 12, 13, 14 and 15.

In the various figures of the drawings the same reference character is employed to refer to the same parts.

Turning now to the drawings, we will first describe our invention in a broad sense and direct attention at this time to the schematic drawings thereof as shown in Figures 11 through 15. Our system includes a housing H having enclosed therein a pair of variable displacement main pumps P–1 and P–2, a pressurizing pump P–3 and a control pump P–4, the pumps all being of the meshing internal-external gear type and being mounted in tandem and commonly driven on a driving means D. The main pumps P–1 and P–2 discharge in parallel through check valves V–1 and V–2, respectfully, into a common outlet in fluid communication with a directional control valve DC. The directional control valve DC is in fluid communication with both sides of an area control or work loading piston means W disposed outside the housing H. A displacement control actuator DA is mechanically coupled to the directional control valve DC through a linkage means L, which linkage means is connected to a pair of pump displacement slide control means S–1 and S–2, the latter being controllable in unison. The slide control means, by movement relative to the meshing gears of the pumps P–1 and P–2, respectively, change the displacement of the pumps. The displacement control actuator DA is hydraulically coupled to a monitoring valve M which is responsive to a mechanical input signal means X disposed outside the housing H, the means X being connected to the control loop (not shown) reflecting the hereinbefore-mentioned variables. The pressurizing pump P–3 insures the necessary supply of fluid to the inlets of the pumps and to the area control or work loading piston means W by pressurizing fluid in a hydraulic reservoir HR disposed outside the housing H. The control pump P–4 is in fluid communication with the monitoring valve M and cooperates with the displacement control actuator DA to move a piston thereof from one position to another position depending upon the position of the valve proper of the monitoring valve M as determined by the input signal means X.

The check valves V–1 and V–2 disposed in the outlets of the pumps P–1 and P–2, respectively, are effective to prevent motoring of one or the other of the pumps in the event of seizure and free running of one of the pumps when one or the other of the pumps is sheared from its driving connection through our novel shear section, to be described, from the common driving means D.

Our fluid system also includes a high pressure relief valve R–1, a low pressure relief valve R–2 and an intermediate pressure relief valve R–3. In addition, there is provided a relief valve R–4 associated with the pressurizing pump P–3 and a relief valve R–5 associated with the control pump P–4. A check valve V–3 is provided in one of the communications between the directional control valve DC and the area control or work loading piston means W. Appropriate filters F–1, F–2 and F–3 are provided in the system together with a heat exchanger E; the filter F–1 and heat exchanger being in the return line to the hydraulic reservoir HR, and the filters F–2 and F–3 being associated with the pumps P–3 and P–4, respectively.

The high pressure relief valve R–1 is in fluid communication with the common outlet of the pumps P–1 and P–2 and ultimately with one side of the area control or work loading piston means W and is so constructed and arranged to prevent excessive pressure build-up in the common discharge outlet beyond a predetermined maximum value.

The low pressure relief valve R–2 is in fluid communication with the directional control valve DC and ultimately with the other side of the area control or work loading piston means W and is so constructed and arranged to prevent excessive build-up of pressure thereby protecting elements in the return line, such as the heat exchanger E and the filter F–1.

The intermediate pressure relief valve R–3 is in fluid communication with the common inlet of the pumps P–1 and P–2 and left hand side of the area control or work loading piston means W and is so constructed and arranged to prevent excessive pressure build-up under reverse loading conditions, as will be more fully described with reference to Figure 14 of the drawings. This relief valve regulates the pressure in the system at a value below that regulated by the high pressure relief valve R–1 and is also effective to prevent damage to the area control or work loading piston means under certain particular conditions as will hereinafter be fully explained in detail.

The relief valves R–4 and R–5 are effective to provide for discharge of fluid from the pumps P–3 and P–4, respectively, under certain operating conditions as will be later apparent. The filters are merely to provide for the removal of any foreign matter which may be present in the fluid in the system. The heat exchanger E is provided in order to reduce the temperature of the fluid flowing to the hydraulic reservoir. The check valve V–3 is operative to allow the flow of fluid into its associated conduit under certain conditions as will be more fully explained hereinafter in detail.

Referring again to the drawings and especially to Figures 1 to 10, there is illustrated, in detail, the structural elements of our fluid pressure system enclosed in the housing H. The housing H comprises a plurality of housing elements suitably secured together by means of bolts or the like, and is provided with an inlet port 100 (Figures 1 and 2), adapted to receive a suitable hose, conduit or the like, opening into a common inlet chamber 101 for the pumps P–1, P–2, P–3 and P–4. The pumps P–1 and P–2 are substantially identical in construction, and are substantially of the same construction as those described and claimed in our copending application Serial No. 609,423, filed September 12, 1956, entitled "Variable Displacement Pump." To facilitate further description, since the pumps are substantially identical, the corresponding parts of the pump P-2 will be identified by using the same reference characters as applied to the pump P-1 but distinguished by a prime (').

Figure 3:
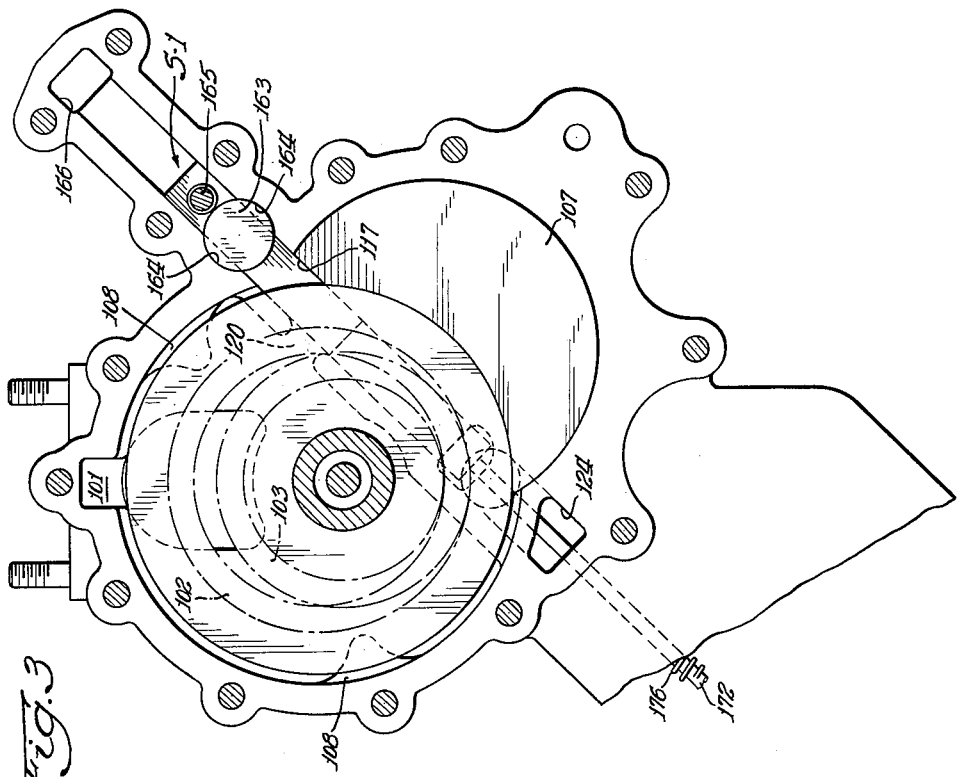
Figure 3 is a view taken on line 3—3 of Figure 1.

The pump P-1 comprises meshing internal and external gears 102 and 103, respectively received within a pumping chamber 104 in the housing H. The pumping chamber 104 is formed to have portions of different dimensions, which comprise a relatively wide portion 105 in communication with the chamber 101 and a narrower portion 106 having a width substantially equal to the thickness of the gears. The internal or ring gear 102 is floatingly supported on bearings, generally indicated at 107, and by lug-like, inwardly extending, gear aligning elements 108 (Figure 3). The bearing means 107 and the lug-like elements 108 as indicated in Figure 3 are substantially the same as the corresponding parts described and illustrated in the aforementioned copending application. The external gear or pinion 103 is provided with axially extending, hollow, cylindrical journal members 110 and 111, formed integrally therewith or attached thereto, and the journal member 111 is provided with an external splined portion 112. The hollow journal members 110 and 111 are rotatably supported in cylindrical bearing members 113 and 114, respectively, received in a complementary shaped bore 115 formed in the housing H. The journal portion 111' associated with the pump P-2 is slightly different from the journal portion 111 associated with the pump P-1 in that it is formed with a concave surface 111'a at its splined end, the purpose of which will become apparent.

The narrow or lower portion 106 of the pumping chamber 104 is constructed of an irregular contour, more fully illustrated in Figure 3, to extend radially upwardly toward the journals 110, 111, and to seal the faces of the gears adjacent the area in which they mesh. The housing elements are formed to provide substantially rectangular grooves 116, 117 which extend to the narrow or seal portion of the chamber side walls (see especially Figure 3). The grooves 116, 117 define a rectangular slide guide means 118 to receive the displacement control slide S-1, later to be described in detail. Passage means 120, 120 formed in the seal or narrow portion 106 of the pumping chamber side walls communicate the slide guide means 118 with the enlarged portion 105 of the pumping chamber 104.

The intermeshing gears 102 and 103 discharge fluid under pressure into discharge passages 121 and 122 located on opposite sides of the gears. The passage 122 communicates directly with a common discharge cavity 123 and the passage 121 is communicated with the cavity 123 by means of the passage 124. The pumps P-1 and P-2 discharge from their discharge cavities 123 and 123', respectively, into a common outlet 125 (Figure 2) through the one-way check valves V-1 and V-2, later to be described in detail.

As previously mentioned, the pumps P-1 and P-2 are commonly driven by means of a driving means D. The driving means D comprises a driving shaft 126 extending from outside of the housing H through the journal members 110' and 111' of the pump P-2 to and within the housing H. Externally of the housing the shaft 126 is provided with an externally splined portion 127 adapted to be drivingly connected to a source of power (not shown), and internally of the housing the shaft is provided with an enlarged end portion 128 provided with external splines 130. The shaft 126, except for the enlarged portion thereof has a diameter less than the internal diameter of the journal members 110' and 111', and is provided with a convex surfaced juncture 131 between the main portion of the shaft and its enlarged portion which is adapted to seat on the concave surface 111'a of the journal member 111' associated with the pump P-2. The enlarged end 128 of the shaft is also formed with an opened-ended cavity 132 therein. The shaft 126 is supported at one end of the housing H by means of sealing means generally indicated at 133. The sealing means 133, constructed in the same manner as that shown and described in the aforementioned copending applictaion, is arranged to not contact the shaft 126, and the shaft 126 is out of engagement with the journal members 110' and 111' throughout their length.

The driving means D also includes an elongated quill shaft 134 rotatably supported at one end in a cylindrical bearing means 135 received in a suitable bore 136 in the housing. The quill shaft 134 is formed with an enlarged terminal end 137 having external splines 138 thereon. The enlarged end 137 of the shaft 134 is of a diameter substantially equal to the diameter of the enlarged portion 128 of the shaft 126, and is further provided with an opened-ended cavity 140 therein, the cavity 140 being in substantial alignment with the previously mentioned cavity 132 in the shaft 126. A coil spring 141 is disposed within the chamber formed by the opened-ended cavities 132 and 140 for a purpose to be described.

A coupling sleeve member, generally indicated at 142, is provided to couple the shafts 126 and 134 for concurrent rotation and comprises a central portion 143 and terminal end portions 144 and 145 joined by means of reduced diameter shear sections 146 and 147, respectively. The portions 143, 144 and 145 are each internally splined to receive in driving relation the external splines 130, 138 on the shafts 126 and 134, the splines 112 on the journal member 111, and the splines 112' on the journal member 111', respectively.

The coil spring 141, as will be obvious, resiliently urges the shafts 126 and 134 in opposite directions and causes the convex surface of the juncture 131 to seat on the concave surface 111'a of the journal member 111' associated with the pump P-2, the seating thereof effectively providing a seal between the outwardly extending surface of the shaft 126 and the remainder of the pump assembly. The particular configuration of the juncture 131 and the surface 111'a allow misalignment of the shaft 126 relative to the shaft 134 without losing the seal just described.

The sealing means 133, as fully described in the aforementioned copending application, effectively isolates the pumping chamber from the drive shaft, the seal being particularly effective to prevent the leakage of fluid from the pumping chamber to the drive shaft and to the outside of the housing H. The seal formed by the juncture 131 and the surface 111'a together with the seal 133 effectively prevent leakage between the drive shaft and the remainder of the pump. While the shaft 126 is isolated, leakage to the various bearing means and the like to provide lubrication thereof is permitted.

The coupling member 142 having the reduced shear sections 146 and 147 provides a means whereby in the event of seizure of one or the other of the pumps P-1 and P-2, its associated shear section will shear and allow the other pump to continue to operate in its usual manner.

The check valves V-1 and V-2 for the pumps P-1 and P-2, respectively, are both received in a cavity 148 formed in the housing H, which cavity communicates with the common discharge conduit 125. The valve V-1 comprises a piston member 150 adapted to seat, and prevent when seated, communication between the outlet cavity 123 and the cavity 148. The piston member 150 is provided with an axially extending stem 151 passing through a suitable opening in a support member 152, the latter including an outer ring-like element 153 fixed within the housing H and a central cup-like portion 154 attached to the ring-like portion 153 by means such as webs or the like (not shown). A coiled compression spring 155 resiliently urges the piston 150 into its seated position.

The valve V-2 comprises a piston member 156 adapted to seat and to prevent communication between the outlet cavity 123' and the cavity 148 and includes an axially extending stem portion 157 received in slidable disposition within the support member 154. The stem portion 157 is provided with an open-ended bore 158 therein to telescopically receive the stem portion 151 of the valve V-1. A coiled compression spring 160 is provided to resiliently urge the piston member 156 into its seating position.

As will be obvious, when both pumps P-1 and P-2 are discharging fluid under pressure, the fluid pressure will unbalance the springs 155 and 160 and cause the piston members 150 and 156 to unseat thereby allowing the discharge to flow into the cavity 148 and to the common outlet 125. Upon shearing of one or the other of the pumps from its driving connection, the sheared pump will become inoperative and its associated check valve spring will operate to hold its check valve piston in seated disposition thereby preventing fluid from the operative pump from passing into the discharge ports of the former to cause motoring thereof and a lowering of the system efficiency.

As more clearly illustrated in Figure 5 the slide control means S-1 comprises a pair of identical, substantially U-shaped members 161 and 162 slidable within the slide guide 118. A cylindrical spacing slug 163 having a height substantially the same as the thickness of the gears and having portions received in complementary shaped grooves 164, 164 (Figure 3) formed in the housing H is disposed between the members 161 and 162. A pin element 165 having an enlarged cylindrical portion of a length substantially equal to the thickness of the gears is provided for connecting the members 161 and 162 for concurrent movement. The end of the members 161 and 162 define with the slide guide 118 a pressure balancing chamber 166 spaced from the meshing area of the gears, the chamber 166 being in communication with the cavity 148 in which the valves V-1 and V-2 are disposed by means of a passage, conduit or the like (not illustrated). The opposite ends of the U-shaped members 161 and 162 are constructed to have flat surfaces 167 and 168, respectively, disposed in sliding engagement with the side faces of the gears adjacent their position of intermeshing and are formed to provide outer surfaces 170 and 171 disposed within the outlet passages 121 and 122, respectively. A rod element 172 is suitably connected to the slide member 162 and extends through an opening 173 in the housing H into a linkage chamber 174. The rod 172 is threadably received in a connecting member 175 and is surrounded by a coiled spring 176 disposed between a portion of the housing H and the connecting member 175. The threaded connection between the rod 172 and the member 175 allows an adjustment of the position of the slide, which may be used to preselect the maximum and minimum displacement values.

The slide control S-2 is identical in construction with the slide control S-1, and to facilitate description, the parts thereof are identified hereinafter and on the drawings with the same reference characters as the slide control S-1 with a prime (') affixed thereto. Also, in a similar manner, the chamber 166 associated with the slide guide S-1 has a corresponding chamber 166' associated with the slide control S-2 which is communicated with the cavity 148 by means of a passage, conduit or the like (not illustrated).

Figure 1:
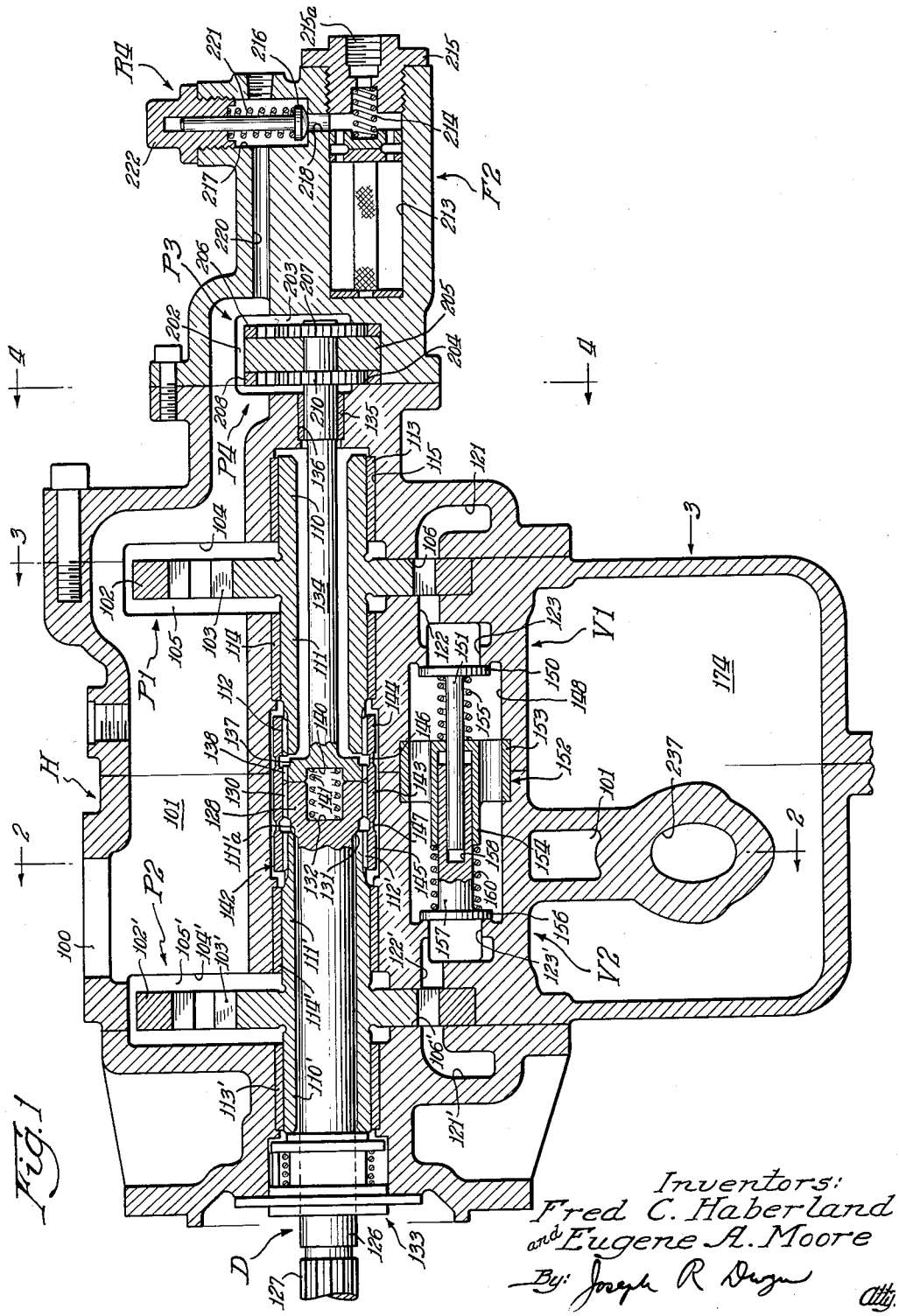
Figure 1 is a partial sectional view taken on line 1—1 of Figure 2.
Figure 2:
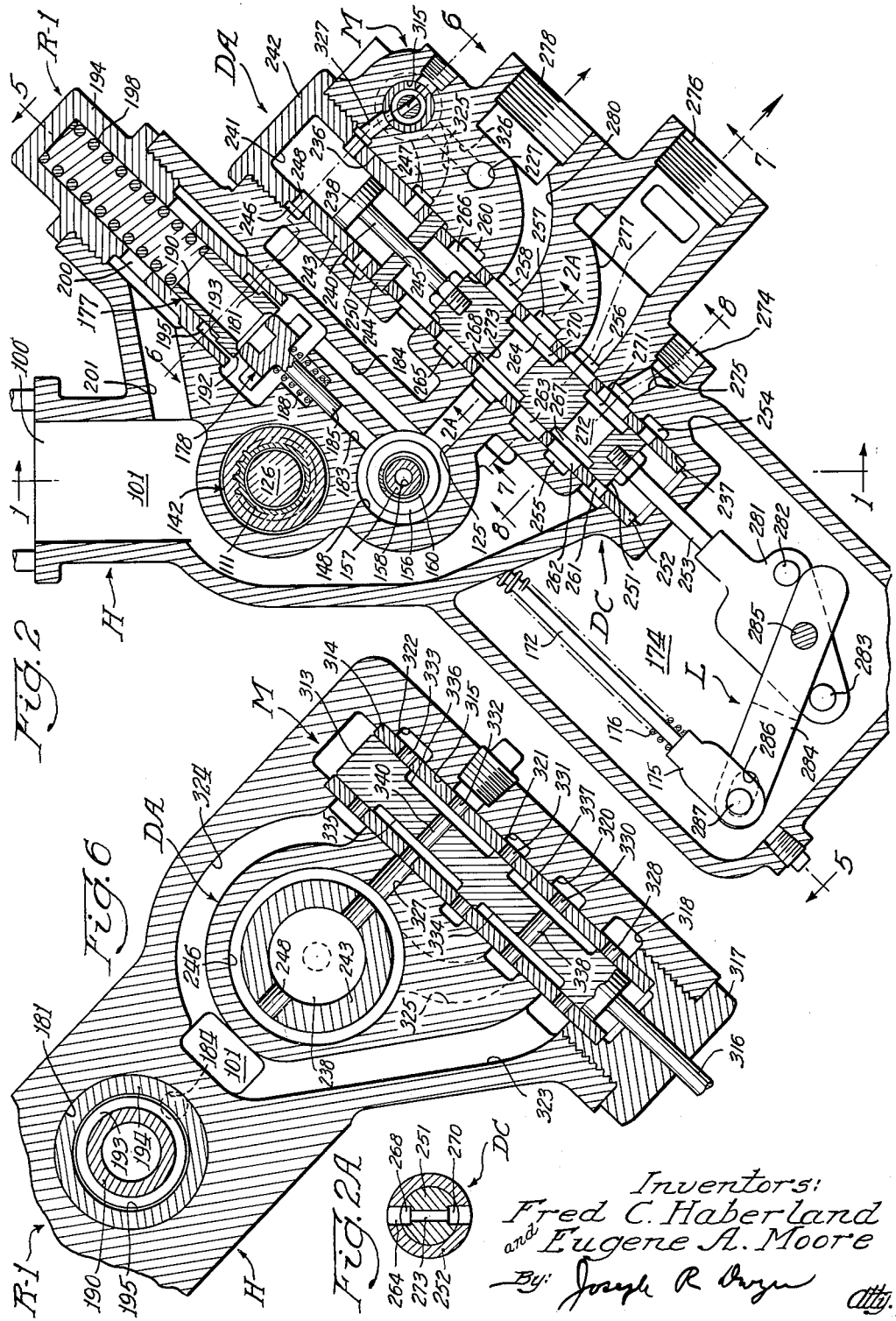
Figure 2 is a slightly enlarged cross-sectional view taken on line 2—2 of Figure 1.

As more clearly illustrated in Figures 2 and 5, the valve R-1 comprises a slidable valve proper 177 and a slidable or floating valve seat 178 received in a housing bore 180 having a first reduced diameter portion 181 and a second reduced diameter portion 182. A bore 183 communicates the cavity 148 in which the valves V-1 and V-2 are disposed and the reduced diameter portion 182 of the bore 180. In addition, a passage or a conduit 184 is provided to communicate the cavity 148 and the bore 180 (see Figure 2). The valve seat 178 is provided with an extending stem portion 185 slidably received within the bore 183 and is also provided with an outwardly extending torus shaped portion 186. The valve seat 178, which is circular in cross-section, is provided with a plurality of circumferentially spaced openings 187 which may take the form of slots, circular passages, or the like. A coiled compression spring 188 surrounds the stem portion 185 and is received within the reduced diameter bore portion 182, so as to resiliently urge the valve seat toward the valve proper.

The valve proper comprises a substantially cylindrical sleeve-like member 190 having an enlarged diameter 191. The enlarged end portion 191 has its inner diameter enlarged, as illustrated, resulting in an annular end surface 192. The juncture of the enlarged portion 191 spaced from the surface 192 defines with the remainder of the valve member 190 an annular surface 193 smaller in area than the surface 192. The valve member 190 is slidably received in a substantially cup-shaped retainer member 194 threadably received within the bore 180 and having communicating bores 195 and 196 therein. The bore 195 has a diameter slightly greater than the outer diameter of the enlarged portion 191 of the valve member 190, and the bore 196 has a diameter substantially equal to the major diameter of the valve member 190 to slidably receive the latter. The bore 195 has a length greater than the length of the enlarged portion 191, so as to define a pressure receiving chamber 197 with the valve member 190. A coiled compression spring 198 is received in the bore 196 and acts against the valve member 190 to resiliently urge it into seating engagement with the valve seat 178. The sleeve member 194 is provided with openings 200 to communicate with a passage 201 formed in the housing H which in turn communicates with the inlet chamber 101.

With regard to the relief valve R-1, it will be noted that fluid under pressure from the pumps P-1 and P-2 into cavity 148 will flow into the conduits 183 and 184. The fluid flowing in the conduit 183 exerts a force on the terminal end of the stem portion 185 of the floating valve seat 178, which together with the coil spring 188, urges the valve seat toward the valve member 190, the member 190 being urged into seating engagement with the seat 178 by means of the oppositely acting coil spring 198. This seating engagement occurs along a line which is the inner diameter of the surface 192. The fluid under pressure flowing through the conduit 184 flows into the bore 181 around the valve seat 178 and between the inner bore 195 of the sleeve member 194 and the outer diameter of the valve member 190. The fluid pressure acts upon the surface 192, and also, in opposition thereto, acts on the smaller surface 193. If the discharge pressure increases, the valve seat 178 will move and carry with it, in its movement, the member 190 in opposition to the force of the spring 198. The extent of movement of the valve seat 178 in the direction of the member 190 is limited by the outwardly disposed portions thereof abutting the terminal end of the sleeve 194. Upon further increase in the pressure and when the pressure acting on the differential area between the surfaces 192 and 193 becomes sufficiently great to overbalance the force of the spring 198, the member 190 will move out of engagement with the floating valve seat 178 and allow a discharge of high pressure fluid through the passages 200 in the sleeve member 194 to the passage 201 and back to the common inlet 101. Upon decrease in pressure, the member 190 will again seat on the seat 178, and the member 190 and the seat 178 will move back to their illustrated positions.

Because of the above construction and operation of the valve R-1, the valve is more sensitive and its parts are retained in alignment throughout all operating conditions. Further, the use of the floating valve seat 178 allows the forces on the spring 198 to be relieved when the pumps P-1 and P-2 are not operating, thereby preventing the spring 198 from taking a permanent set; an important feature in a system of this type. Also, the particular arrangement of pressure receiving areas permits the use of much lighter springs than would be normally required.

The control pump P-4 and the pressurizing pump P-3 (see Figures 1 and 4) comprise fixed displacement internal-external gear pumps driven by the common driving means D and have one gear mounted in driving relationship on a portion of the shaft 134 extending beyond the cylindrical bearing means 136. The two pumps are received in a pumping chamber 202 in communication with the common inlet chamber 101, the pumping chamber 202 having a wide portion 203 and a narrow portion 204. The pumping elements are separated by a spacer 205 mounted in the pumping chamber 202. The pump P-3 comprises an internal or ring gear 206 floatingly supported in the pumping chamber 202 and an external gear or pinion 207 suitably affixed to the shaft 134. The pump P-4 comprises an internal or ring gear 208 and an external gear or pinion 210 suitably affixed to the shaft 134. The pumping chamber 202 is provided with inwardly extending spaced lug-like portions 211 to provide support for gears 206 and 208 in the same manner as that described with reference to the pumps P-1 and P-2. The narrow or lower portion of the pumping chamber, as will be seen in Figure 4 (particular attention being directed to reference numeral 209), extends radially upwardly toward the shaft 134 to seal on the faces of the gears adjacent the area in which they mesh, and within this area there is provided discharge ports 212, one for each of the pumps P-3 and P-4. As will be obvious, the discharge ports 212 will be located in the opposite walls of the narrow portion 204 of the pumping chamber 202.

The pump P-3 supplies fluid under pressure to the hydraulic reservoir HR (not shown in Figures 1 to 10 but see Figures 11 to 15 inclusive) and there is disposed within this fluid circuit the filter F-2 and the relief valve R-4. The filter F-2 (Figure 1) is received within a bore 213 formed in the housing H, and as viewed in this figure, the left end of the bore 213 is in communication with the outlet port 212 of the pump P-3 by means of suitable passage means (not shown). The filter F-2 is resiliently urged and retained in its illustrated position by means of a coil spring 214 cooperating with a bore closure member 215 threadably received within the bore 213, and the closure member 215 is provided with a threaded port 215a for receiving a suitable hose, conduit or the like leading to the hydraulic reservoir HR.

The relief valve R-4 comprises a resiliently urged valve proper 216 received within a housing bore 217 which communicates at one end with the bore 213 by means of a passage 218, and at one side with the common inlet chamber 101 by means of a passage 220. The valve member 216 is resiliently urged into seating engagement with a valve seat formed by the juncture of the bore 217 and the passage 218 by means of a coiled compression spring 221. The spring 221 is retained in proper position by means of a bore closure member and spring retainer 222 threadably received within the bore 217, the retainer 222 being also adapted to receive and guide a portion of the valve member 216 in its movement.

When the fluid pressure acting on the valve proper 216 becomes sufficient to overbalance the spring 221, the valve proper will become unseated and allow a flow of fluid through the passage 220 to the inlet chamber 101.

The pump P-4 supplies fluid ultimately to a port, later to be described, associated with the monitoring valve M; the filter F-3 and the relief valve R-5 being disposed in this fluid circuit (see Figures 2, 4, 9 and 10).

The filter F-3 is disposed within a housing bore 223 having one end in communication with the outlet port 212 of the pump P-4 by means of a passage 224. The bore is closed by means of a closure and retainer member 225 threadably received therein which retains a coiled compression spring 226 adapted to resiliently urge the filter to its illustrated position. Adjacent the closure member and in communication with the bore 223 there are provided passages 227 and 228. The passage 227 ultimately leads to a port of the monitoring valve M in a manner to be later described. The passage 228 communicates with a bore 230 in which the relief valve R-5 is disposed.

The relief valve R-5 comprises a valve member 231 resiliently urged, by means of a coiled compression spring 232, into seating engagement with a washer-like valve seat 233 retained within the bore 230 by means of a closure member 234 threadably received within the bore 230. The closure member 234 is provided with the necessary passage means, generally identified at 235, to provide communication between the passage 228 and the central opening in the seat member 233. There is also provided a passage (not shown) to communicate the bore 230 behind the valve member 231 with the common inlet cavity 101.

When the fluid pressure acting on the valve member 231 becomes sufficient to overbalance the spring 232, the valve member will unseat and allow a flow of fluid through a passage to the inlet chamber 101.

As more clearly illustrated in Figure 2, the displacement control actuator DA and the directional control valve DC are disposed within connecting housing bores 236 and 237, the bore 236 being slightly larger in diameter than the bore 237. (It should be noted, at this time, that the displacement control actuator DA and the directional control valve DC are illustrated in different bores in the schematic Figures 11 through 15; however, their effective operation is the same.)

The displacement actuator DA comprises a piston member 238 having an extending stem portion 240 and being slidably received within a cylinder cavity 241 defined by a closure member 242 threadably received within the bore 236 and having a sleeve-like portion 243, and a cylinder or washer-like member, 244 provided with a central opening 245 through which the stem portion 240 is adapted to pass. The bore 236 is provided with spaced annular grooves 246 and 247, and the portion 243 of the closure member 244 is provided with radial openings 248 and 250 providing communication between the cavity 241 and passages 246 and 247, respectively.

The directional control valve DC comprises a spool-like member 251 slidably received within a cylindrical sleeve member 252 disposed within the bore 237 and abutting the cylinder member 244 of the displacement control actuator DA. At one end, the spool-like member 251 is connected to the stem portion 240 of the piston 238 of the displacement control actuator DA, and the opposite end of the spool-like member 251 has connected thereto a rod 253 which in turn is connected to the linkage means L, later to be described. The bore 237 is provided with spaced annular grooves 254, 255, 256, 257, 258 and 260, the grooves 254 and 260 being in communication with the common inlet 101 while the groove 257 is in communication with the common outlet 125 of the pumps P-1 and P-2. The sleeve member 252 is provided with spaced radial passages 261, 262, 263, 264, 265 and 266 communicating with the grooves 254, 255, 256, 257, 258 and 260, respectively. The spool-like member 251 is cylindrical in cross-section and is provided with grooves 267, 268, 270 and 271, the grooves 267 and 271 being located radially oppositely of one another and being connected by a diametrically disposed passage 272, while the grooves 268 and 270 are located radially oppositely one another and are connected by a diametrically disposed passage 273.

With particular reference to Figure 2A, which more vividly shows an important aspect of our spool-like member 251, it can be seen that the grooves 268 and 270 form areas under pressure of a thickness substantially less than the diameter of the spool and connected by passage 273 for communication of fluid pressure therebetween. The grooves 268 and 270 may be formed in any convenient manner such as shown in Figure 2A and need not be of the same depth throughout in order to function properly. By constructing the spool-like portion of a valve of this type there is less leakage around the peripheries of the valve than found in prior art type spool valves and less sticking. In this connection, one explanation of the sticking of prior art spool valves, particularly bad when dealing with high pressure, is that leakage around the peripheries of the lands is uneven tending to urge the land against the cylindrical walls on the side opposite the major leakage path. In our valve by utilizing the grooves the valve is encompassed in a film of oil throughout its periphery thus reducing sticking and incidentally providing a better seal, and it should be pointed out here, too, that with the spool-like valves formed according to the teachings of our invention it is not necessary to have the pressure areas of the valve longitudinally spaced from one another viz. it is possible to have grooves 268 and 270 normal to each other, thus foreshortening spool-type valves.

The groove 255 is connected to a screw threaded port 274 by means of a passage 275, the port 275 being adapted to receive a hose, conduit or the like attached at its other end to the hydraulic reservoir HR (not shown in Figures 1 to 10). The groove 256 is connected to a screw threaded port 276 by means of a passage 277, and the groove 258 is connected to a screw threaded port 278 by means of a passage 280. The ports 276 and 278 are adapted to receive suitable hoses, conduits or the like from opposite ends of the area control or work loading piston means W (not shown in Figures 1 to 10).

The linkage means L includes the rod 253 connected to the spool-like member 251 and having attached thereto a substantially triangular shaped member 281. The member 281 is provided with spaced extending pins 282 and 283 for contacting respectively opposite sides of a linkage bar 284 pivotally mounted intermediate its ends but nearer one end than the other or a fixed pivot stud 285 extending from the housing H. The other end of the bar 284 is provided with an elongated opening 286 through which passes a cylindrical rod 287 affixed to the spaced members 175 and 175′ associated with the slides S–1 and S–2, respectively. The elongated opening 287 forms a lost motion connection with rod 287 for freedom of movement of the spaced members 175 and 175′.

As more fully explained in the aforementioned copending application and as can be seen in Figures 3 and 5, by changing the position of the slide means relative to the intermeshing gears of the pump, the displacement therefrom may be varied from zero to a maximum value. As will be obvious, the meshing gear teeth adjacent the slide control means form isolated pockets in which fluid is trapped, and as the gears approach their full meshing positions, these pockets decrease in volume, so that the trapped fluid is squeezed therein, thereby raising the fluid pressure. If all of the pockets are communicated to outlet, the full displacement condition will exist, but if none of the pockets are so communicated, the zero displacement condition will exist. The pockets in advance of the slide surfaces 170, 171, 170′, 171′ (see Figure 5) are in communication with the outlet, while the pockets behind the surfaces 167, 168, 167′, 168′ contacting the gear side faces are in communication, by way of the passages 120, 120′, with the inlet chamber 101. Any change in the position of the slide control means S–1 and S–2 will therefore change the displacements of the pumps P–1 and P–2, respectively.

With particular reference to the drawings, zero displacement occurs when the slide control means S–1 and S–2, which act together, are in their lowermost positions and maximum displacement occurs when the slide control means are in their uppermost positions. The aforementioned application illustrates and describes several means for accomplishing this result. In the instant application, the slide control means S–1 and S–2 are pressure balanced, that is, the surfaces 170, 171, 170′, and 171′ are subjected, as will be obvious, to discharge pressure in the discharge cavities of the pumps, and this same discharge pressure will be conducted to the chambers 166 and 166′ positioned at the opposite ends of the slides from the discharge chambers. The surfaces of the slide means opposite those disposed within the pump discharge chambers are of substantially the same areas, so that with the same pressure acting on substantially equal areas, the slide means will remain in any set position. As previously explained, the slide control means have attached thereto the rods 172 and 172′ connected to the linkage means L, and the rods 172 and 172′ are surrounded by coil spring 176 and 176′, respectively. The coil springs, due to their disposition and selected pressure value, act to urge the slide means toward their lowermost positions, i.e., their positions of lower pump displacement. Thus, by operation of the linkage means L, the displacement of the pumps may be varied from zero to their maximum value or from some preselected minimum value to their maximum value, as the case may be; this being accomplished by movement of the piston means 238 of the displacement control actuator and movement of the spool-like member 251 of the directional control valve DC.

Turning now in particular to Figure 2, if the piston 238 and the spool-like member 251 are moved downwardly, the rod 253 attached to the member 251 and the substantially triangular shaped member 281 will also move downwardly. The pin 282 will contact the linkage bar 284 and cause the bar to pivot clockwise about the stud 285, thereby causing the rods 172 and 173′ to move upwardly, which in turn will move the slide control means S–1 and S–2 upwardly thereby increasing the displacement of the pumps P–1 and P–2.

Upon the reversal of movement of the piston 238 and the spool-like member 251, the spring means 176 and 176′ will urge the slide control means and the linkage means to its illustrated position wherein the displacement of the pumps P–1 and P–2 is at or near zero value, and wherein the linkage bar 284 will be in contact with both the pins 282 and 283. Further movement of the piston 238 and the member 251 upwardly will cause the linkage bar 284 to be pivoted about the fixed pivot 285 by means of the force applied thereto by the pins 283, thereby moving the rods 172 and 172′ and the connected slide control means S–1 and S–2 upwardly, thereby again increasing the displacement of the pumps P–1 and P–2. Due to the construction of the linkage means L, the displacement of the pumps will always pass through zero or through some preselected minimum displacement value upon reversal of direction of movement of the piston 238 and the directional control valve member 251.

Figure 8:
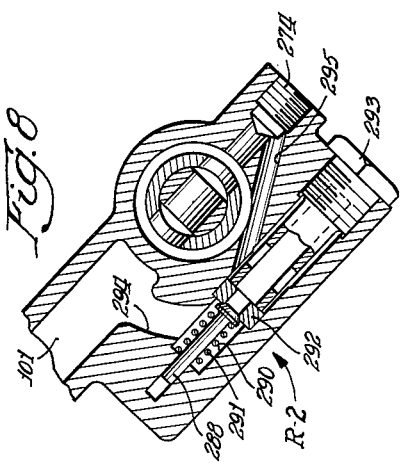
Figure 8 is an enlarged partial sectional view taken on line 8—8 of Figure 2 and illustrating another of the relief valves.

Turning now to Figure 8, it can be seen that the relief valve R–2 comprises a valve member 288 received in a housing bore 290 and resiliently urged by means of a coiled compression spring 291 into seating engagement with a valve seat 292 retained in its illustrated position by means of a bore closure member 293 threadably received in the bore 290. The bore 290 on one side of the valve member 288 is in communication with the common inlet cavity 101 by means of a housing passage 294, and the bore 290, on the other side of the valve member 288, is in communication with the port 274 (communicating with filter F–1) by means of a passage 295, which passage also intersects and communicates with the groove 255.

When the fluid pressure acting on the valve member 288 becomes sufficient to overbalance the spring 291, the valve member will become unseated and allow a flow of fluid through the passage 294 to the inlet chamber 101.

Figure 7:
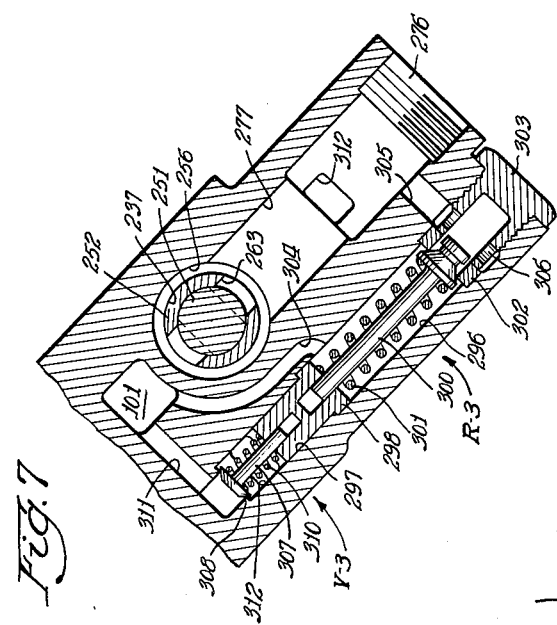
Figure 7 is an enlarged partial sectional view taken on line 7—7 of Figure 2 and illustrating to advantage one of the relief valves and one of the check valves.

As more clearly illustrated in Figure 7, the relief valve R–3 and the check valve V–3 are received in communicating housing bores 296 and 297, respectively. A member 298 isolates one valve from the other.

The valve R-3 comprises a valve member 300 received within the bore 296 and resiliently urged into seating engagement, by means of a coiled compression spring 301, with a valve seat 302 retained in position by means of a bore closure member 303 threadably received in the bore 296. One end of the bore 296 communicates with the common inlet cavity 101 by means of a housing passage 304, and the other end of the bore 296 communicates with the port 276 by means of a housing passage 305 and pasages 306 formed in the closure member 303.

When the fluid pressure acting on the valve member 300 becomes sufficient to overbalance the spring 301, the valve member will become unseated and allow a flow of fluid through the passage 304 to the inlet chamber 101.

The valve V-3 comprises a valve member 307 received within the bore 297 and resiliently urged into seating engagement with a valve seat shoulder 308 formed in the housing H by means of a coiled compression spring 310. One end of the bore 297 communicates with the common inlet cavity 101 by means of a housing passage 311, and the other end of the bore 297 communicates with the port 276 (communicating with the work loading piston means W) by means of a housing passage 312.

Under certain conditions as will become apparent later, the inlet fluid pressure acting on the valve member 307 will unbalance the spring 310, thereby unseating the valve member and allowing a flow of inlet fluid through the passage 312 and into the conduit 277.

As clearly shown in Figures 2 and 6, the monitoring valve M comprises a spool-like valve element 313 slidably received within a cylindrical sleeve element 314 fixably retained within a bore 315 formed in the housing H. The spool-like element 313 is formed with an extending rod portion 316 passing through a bore closure member 317 threadably received in the bore 315. The rod portion 316 is connected in some suitable manner to the mechanical input signal means X (not shown in Figures 1 to 10).

The bore 315 is provided with spaced annular grooves 318, 320, 321 and 322, the grooves 318 and 322 communicating with the common inlet cavity 101 by means of housing passages 323 and 324, respectively. The groove 320 communicates with the groove 247 associated with the displacement control actuator DA by means of a housing passage 325. The groove 321 communicates with the passage 227 connected with the pump P-4 by means of a passage 326 (see especially Figure 2). In addition to the connections just described, the bore 315 is also connected to the groove 246 of the displacement control actuator DA by means of a housing passage 327.

The sleeve 314 is provided with spaced radial openings 328, 330, 331, 332 and 333 which communicate respectively with the grooves 318, 320, 321, the passage 327 and the groove 322.

The spool-like element 313 is substantially cylindrical in cross-section and is provided with oppositely disposed, spaced grooves 334, 335, 336 and 337. The grooves 334 and 337 are connected by means of a radial passage 338 and the grooves 335 and 336 are connected by means of a radial passage 340. Grooves 334, 335, 336 and 337 are thus formed to accomplish an improvement in this type of valve as in connection with Figure 2A.

Particular attention is now directed to Figures 11 through 15 wherein there are shown, schematically, the elements enclosed within the housing H and some elements of our system not enclosed with the housing H.

It should be pointed out at this time, also, that the linkage means illustrated in Figures 2 and 5 is arranged differently than the linkage means illustrated in Figures 11 through 15, however, the operation of both forms of linkage means is the same, that shown in Figures 11 through 15 being used to facilitate the description of the operation of our fluid pressure and control system.

The hydraulic reservoir HR comprises a large upper chamber 350 and a small lower chamber 351. A piston member 352 having a central aperture therein is slidably disposed within the lower chamber 351 and a piston member 353 is slidably disposed within the upper chamber 350. The piston members are connected by means of a connecting rod 354 having a central opening or passage 355 therethrough which provides communication between the chambers 350 and 351 below the respective piston members. A conduit, hose or the like 356 provides communication between the upper chamber 350 and the common inlet 100 and 101 of the housing H; a conduit, hose or the like 357 provides communication between the lower chamber 351 and the port 215a of the housing H; and a conduit, hose or the like 358 communicates the housing bore 274 and the upper chamber 350, the filter F-1 and the heat exchanger E being disposed therebetween.

The form of linkage means illustrated in the schematic drawings comprises a fixed pivot member 361, and a pivot bar 362 centrally pivoted on the member 361 and attached at its opposite ends to the piston 238 of the displacement control actuator DA and the spool-like valve member 251 of the directional control valve DC. A coil spring 363 resiliently urges the rod members 172 and 172' and the connected slide control means S-1 and S-2, respectively, toward their zero displacement positions, and the rod means is provided with spaced contact points 364 and 365 adapted to be engaged by the pivot bar 362, so as to move the rod members and the associated slide control means between their various positions.

The area control or work loading piston means W comprises a cylinder 370 having a piston 371 slidable therein and to which is attached or made integral therewith, a piston rod 372 connected in a suitable manner to the load or cone segments (not shown). The p'ston 371 is provided with a bleed opening or orifice 373 therethrough. The cylinder 370 is provided with ports 374 and 375 and suitable conduits, hoses or the like 376 and 377 are provided for connecting the ports 374 and 375, respectively, to the housing bores or ports 276 and 278, respectively.

*Operation*

We will now describe the operation of our fluid control system under several different operating conditions and with particular reference to Figures 11 through 15. First, it must be noted that there are four separate and distinct values of fluid pressure existing in the system at any given time and these values of fluid pressure are shown in accordance with the legend of Figure 16.

Rotation is imparted to the common driving means D by means of the jet engine with which the system is associated, so that the driving gears of the pumps P-1, P-2, P-3 and P-4 will be rotating. Each of the four pumps receives its inlet fluid supply from the common inlet chamber 101 which is in fluid communication with the chamber 350 of the hydraulic reservoir HR by means of the conduits 356.

The pump P-3 is the pressurizing pump and discharges fluid through the filter F-2 and into the conduit 357 to the upper portion 351a the lower chamber 351 of the hydraulic reservoir HR, the upper portion 351a being on the side of the piston 352 near the upper chamber. The chamber 351, under discharge pressure from the pump P-3, acts to pressurize the fluid in the upper chamber 350 by means of the pair of pistons 352 and 353, the pressure from the pump P-3 tending to move the connected pistons 352 and 353 downwardly thereby pressurizing the fluid in the chamber 350 and insuring the proper supply of fluid to the inlet chamber 101 under all conditions of operation.

The relief valve R-4 is disposed between the pump P-3 and the hydraulic reservoir HR so as to provide a relief of fluid pressure if and when its value becomes excessive.

The control pump P-4 discharges fluid under pressure into the control conduit 224, through the filter F-3 and into the conduit 227. The relief valve R–5, disposed within this circuit, prevents an excessive build-up of pressure beyond a predetermined selected value. The conduit 227 is connected to the port 331 of the monitoring valve M and under some conditions of operation, as will become apparent, the pressure from the pump P–4 will flow to the displacement control actuator DA to act upon its piston 238 and move the piston 238 from one position to another. The movement of the piston 238 by the fluid pressure from the control pump P–4 will be determined by the position of the spool-like member of the monitoring valve M, and the position of the latter is determined by the input signal means X as reflected in the control loop. As will be more apparent from the detailed description hereinafter, the pressure in the monitoring valve M as it is communicated to the displacement control actuator DA provides a base pressure against which the monitoring valve operates.

The pumps P–1 and P–2 commonly driven with the pumps P–3 and P–4 receive their inlet supply of fluid from the common inlet chamber 101 and each respectively discharge fluid under pressure into the common outlet conduit 125 through the pair of parallel connected outlet conduits 123 and 123'. As previously mentioned, the valves V–1 and V–2 prevent the reversal of flow of fluid from the outlet conduit 125 to one or the other of the pumps upon the shearing of one pump from its driving connection. The common outlet conduit 125 communicates with the port 264 of the directional control valve DC, and dependent upon the position of the spool-like member 251, high pressure fluid discharged by the pumps P–1 and P–2 may be communicated to either side of the area control cylinder 370 of W through the conduits 277 and 280 connected to the ports 263 and 265, respectively, of the valve DC and the conduits 376 and 377 connected respectively to the ports 374 and 375 of the cylinder 370. Inlet pressure from the upper chamber 350 of the hydraulic reservoir HR may also be communicated to either side of the area control cylinder 370 through the ports 263 and 265 of the valve DC and the ports 374 and 375 of the cylinder 370 depending upon the position of the spool-like member 251. An additional port 261 of the valve DC is connected to the inlet supply of fluid to permit the return of fluid thereto under certain conditions wherein excessive flow and consequently high pressure build-up exists or may be caused to exist in the conduit 275 which is in communication with the conduit 358 in which the filter F–1 and the heat exchanger E are disposed; this effectively preventing damage to the filter F–1 and the heat exchanger E.

In systems of this type, the mechanical input signal means is electrically and mechanically balanced with the area control or work loading piston and by a change of the load on the latter, such as caused by a change of engine temperature, by a change in altitude or by deliberate change as in the throttle position, the control loop from which the mechanical input signal means X receives its signal, becomes unbalanced. Since the monitoring valve M is mechanically coupled to the input signal means, any unbalance in the control loop will necessarily be reflected in the monitoring valve, and as will hereinafter be explained, this unbalanced reflection in the monitoring valve M operates to return the control loop to its balanced condition. The balanced condition of the control loop and the position of the monitoring valve when the control loop is balanced will be hereinafter referred to as the null positions thereof.

Turning now to Figure 11 of the drawings, there is shown our system under conditions wherein the load on the area control or loading piston 371 tends to move the piston to the right. Assume for some reason that it is desired to move the piston 371 to the left, the following description will explain in detail the cooperation of the various elements of our system during such an operation.

Under this assumed condition, the monitoring valve M is displaced to the left by the action of the means X due to an unbalanced condition in the control loop and uncovers the port 331 thereof, thereby providing a communication between the ports 331 and 330. This communication allows a flow of fluid from the control pump P–4 to the conduit 325 and to the port 250 in the displacement control actuator DA, so that the piston 238 thereof will be moved downwardly due to the fluid pressure acting on the upper surface thereof. Downward movement of the piston 238 causes the linkage bar 362 to pivot clockwise about the fixed pivot member 361 and causes a corresponding upward movement of the spool-like member 251 of the directional control valve DC. The linkage bar also contacts the contact point 364 and causes a downward movement of the rods 172 and 172' affixed to the slide control means S–1 and S–2, respectively, thereby increasing the displacement of the pumps P–1 and P–2. The discharge from the pumps P–1 and P–2 into the common outlet conduit 125 is communicated through the ports 264 and 265 of the directional control valve DC, through the conduits 280 and 377, through the port 375, and into the right end of the cylinder 370 where it acts against the right hand side of the area control piston 371 tending to move the piston to the left.

With the fluid pressure acting on the right hand side of the piston 371, a certain amount of fluid will flow from the right hand side of the piston and ultimately to the hydraulic reservoir HR through the bleed port 373 in piston 371, the passages 376 and 277, the ports 263 and 262 of the valve DC, the passage 275 and the conduit 358.

As previously mentioned, downward movement (as viewed in the drawings) of the piston 238 of the actuator DA will cause an increase in displacement of the pumps P–1 and P–2, and with such increase in displacement, the flow of fluid to the right hand side of the piston 371 will be increased. The flow thereto will continue to increase until the control loop means reaches a null or a balanced condition. Upon the control loop reaching its balanced condition, the means X will return to its position corresponding to the null position of the monitoring valve M and the monitoring valve M will tend to stop the flow of pressure from the control pump P–4 to the actuator DA thereby tending to stop the movement of the piston 238. However, the flow of fluid to the right hand side of the area control piston 371 will continue until the control loop means becomes unbalanced to cause a reversal of movement of the monitoring valve M and to thereby provide for the flow of fluid from the control pump P–4 to the port 248 of the actuator DA, which fluid will act upon the lower surface of the piston 238 and cause an upward movement thereof.

In reaching the balanced condition in a system of this type, the area control piston will overtravel its desired final position in an amount equal to the sensitivity of the system. Within a short period of time the piston will come to rest at its final or null position, and its movement in reaching this null position may be plotted as an oscillatory wave of decreasing amplitude, as for example, by a curve defined by $y = e - ax \sin bx$. Also, when the system is in a balanced condition the monitoring valve M will be in its neutral or null position.

The ability of our system to ultimately rest at a final or null position, that is to form a new base or abscissa as determined by the control loop requirements is one important aspect of our system which should not be overlooked. It is this ability or aspect which differentiates our system over prior art systems of this general nature, which prior art systems cannot seek a new base or null position without oscillation about the new base or abscissa. As a result of this in the prior art systems, the nozzle cone segment will flutter continuously unless the entire system is manually set, or perhaps set by some additional means outside the system itself according to a new base line. This latter adjustment will require continuous monitoring since the prior art system must be reset or rebalanced each time the cone segment takes a new position.

The system condition as described and shown with reference to Figure 11 may occur, for example, with the aircraft in flight and the pilot changes the engine throttle position, or when the pilot desires to climb. The continuous atmospheric pressure change resulting from climbing may require a continuous change of movement of the piston 371 (and a resultant continuous change in the nozzle area), even though all of the variables affecting the control loop remain balanced or the same under the change in atmospheric pressure. During this continuous change the control loop may again be balanced and consequently the monitoring valve M will be in its neutral or null position. However, this does not affect the flow of pressure from the pumps P-1 and P-2, so that the pressure will still be applied to the right hand face of the piston 371 and will continue to move the piston at the desired and necessary rate for the proper operation of the engine cone under these conditions.

Turning now to Figure 12, we will describe the operation of our system wherein the load on the area control piston 371 tends to move the piston to the right and it is desired to hold the piston from movement (and to hold the nozzle area constant). The control loop under this condition is balanced, so that the monitoring valve M is in its neutral or null position. The pumps P-1, P-2, P-3 and P-4 are discharging their fluid in a similar manner to that described with reference to Figure 11; however, the flow of fluid from the control pump P-4 is blocked by the monitoring valve, so that it is not communicated to either side of the piston 238 of the actuator DA. Therefore, no movement of the piston 238 will occur under this condition, and therefore, there will be no movement imparted to the spool-like member 251 of the directional control valve DC nor to the slide control means S-1 and S-2 of the pumps P-1 and P-2, respectively. The slide means S-1 and S-2 are in relatively low displacement positions, and the pumps P-1 and P-2 are discharging their fluid through the control valve DC to the area control cylinder 370 to act on the right hand side of the piston 371. As in the case of the condition, illustrated and described with reference to Figure 11, fluid will flow through the passage or orifice 373 in the piston 371; however, the amount of fluid flowing to the cylinder 370 is equal to the amount of fluid flowing through the passage or orifice 373, and this fluid is sufficient to maintain the piston 371 in its desired position. The flow of fluid from the left hand side of the cylinder 370 is communicated to the hydraulic reservoir HR in the same manner as that described with reference to Figure 11, except that the portion 261 of the valve DC is blocked since it is unnecessary to provide this additional flow return due to the relatively low quantity of fluid flowing in the system. Also, it is desirable, to protect the various elements of our system, that the flow of fluid be through the filter F-1 and the heat exchanger E. In the event that the load exerted on the piston 371 is momentarily increased, and thereby causes an excessive amount of fluid to flow through the passage 373, the check valve V-3, connected to the common inlet 101 will open to supply fluid to fill the cylinder on the left hand side of the piston 371 and prevent cavitation, i.e., will allow fluid to flow from the chamber 101 to fill the cylinder space vacated upon the rod withdrawal.

Under these relatively low displacement conditions of the pumps P-1 and P-2, the pressurizing pump P-3, which as previously mentioned is of the constant displacement variety, merely discharges through the relief valve R-4, and the amount of fluid leaving the chamber 350 of the hydraulic reservoir HR is equal to the amount of fluid being returned thereto from the system.

It is important to note here that the null position reached during this work loading condition, pumps P-1 and P-2 may be at any displacement condition, whatever is necessary to replace the fluid in the right hand side of cylinder 370 lost through passage or orifice 373 and any increase in the load causing the piston to move to the right with increased flow through orifice 373 will cause the control loop to sense this drift or unbalance and cause the system to act as explained in connection with Figure 11. A decrease in load will cause the system to act in a manner later to be described.

The operation of our system as shown schematically in Figure 13 represents a condition in which the area control or work loading piston 371 is traveling to the right, for example, when the aircraft is on the ground, as distinct from that shown in Figure 11 where the area control piston is traveling to the left. This operation is for momentary reverse loading which may be encountered through friction in movable parts, distortion, etc., perhaps causing sticking of one or more of the various elements. Under normal flight conditions, however, the load is normally tending to pull the area control piston to the right.

The pumps P-1, P-2, P-3 and P-4 are discharging pressure in a similar manner to that described with reference to Figure 11; however, the monitoring valve M is so positioned that its inlet port 331 communicates fluid under pressure from the pump P-4 through the port 332, the conduit 327, the port 248, and against the lower side of the piston 238 of the displacement control actuator DA. Concurrently, the chamber above the piston 238 is open to inlet through the port 250, the conduit 325 and the ports 330 and 328. The fluid pressure from the pump P-4 causing movement of the piston 238 in an upward direction, as shown in the drawings, causes a downward and opposite movement of the spool-like member 251 of the directional control valve DC by counterclockwise movement of rod 362 about fixed pivot point 361 and by operation of spring 363, so that the flow of fluid under pressure from the pumps P-1 and P-2 through the common outlet conduit 125 is communicated to the port 263 of the valve DC and thereby to the conduits 277 and 376, the port 374, into the cylinder 370 and acts against the left side of the area control piston 371. The cylinder portion at the right side of the piston 371 is communicated to inlet through the port 375, the conduits 377 and 280, and the ports 265 and 266 of the valve DC. The port 266 may be connected, if desired, to the filter F-1 and the heat exchanger E, but since the flow of fluid through the port 266 is only occasional and then for a short duration, the connection is ordinarily not necessary. However, if such a connection is desired, a suitable one-way check valve may be provided to prevent the flow of fluid into the port 262. The discharge from the pump P-3, under these conditions, is flowing into the chamber 351a of the hydraulic reservoir HR through the conduit 357, so as to provide the pumps with sufficient fluid for filling the cylinder on the left hand side of the area control piston 371 and to maintain system pressurization caused by the reduction in the volume of fluid in the system by retraction of rod 372, which volume must obviously be replaced.

Incidentally, the sole purpose of pump P-3 is to assure sufficient fluid in the system to replace the rod 372 upon retraction or movement to the right, and by using a small piston 352 cooperating with a large piston 353 in the reservoir HR, we can use a small pump such as P-3. It should be noted, however, that our system would function equally as well with a spring acting on piston 352 instead of using pump P-3 but present requirements by jet engine systems, however, require pump P-3 in our system.

Under the conditions represented by Figure 13, the movement of the piston 238 with the consequent movement of the linkage bar 362 from any prior position causes the displacement of the pumps P-1 and P-2 to change through the operation of the spring 363, the contact points 364 and 365 and the slide control means S–1 and S–2. Because of the structural relationship of the parts comprising the linkage means L, the pumps will first return to zero displacement or to preselected low displacement before the flow of fluid to the sides of the area control piston is changed.

Thus, upon reaching a balanced condition in the control loop, our system again becomes balanced with the area control piston means W reaching its null position in a similar manner to that previously described.

The schematic illustration of Figure 14 shows our system when it is desired to move the area control piston 371 to the right, that is, in the direction of the load. Such movement ordinarily will be rapid, so that care must be taken to first prevent cavitation on the left side of the piston 371, and second, there must be provided a means of regulating the return of fluid from the right hand side of the piston 371 according to the desired rate of change of the piston. Under these conditions, little or no pressure need be discharged from the pumps P–1 and P–2 since the normal pull of the load is usually sufficient to move the piston 371 to its desired position.

The pumps P–1, P–2, P–3 and P–4 are discharging fluid under pressure in a manner similar to that described with reference to Figures 11 and 12, except as pointed out above, the pumps P–1 and P–2 are discharging at little or no pressure. The monitoring valve M is positioned to communicate its ports 331 and 332, so that control pressure from the pump P–4 flows through the conduit 327 and to the port 248 to act against the lower side of the piston 238 of the actuator DA thereby moving the piston 238 upwardly and causing a downward movement of the spool-like member 251 of the valve DC. The common discharge conduit 125 of the pumps P–1 and P–2 is connected to the left hand side of the area control piston 371 through the ports 264 and 263 of the valve DC, the conduits 277 and 376, and the port 374 of the cylinder 370. The right hand side of the area control piston 371 is communicated to inlet through the port 375, the conduits 377 and 280, and ports 265 and 266. In the event that the supply of fluid to the left hand side of the piston 371 from the pumps P–1 and P–2 is not sufficient, the valve V–3 will operate; the spring of the valve V–3 being preselected to allow the unseating of the valve proper to connect the inlet chamber 101 with the conduit 277. The check valve V–3 compensates for the possibility that the load may cause a rapid movement of the piston 371 with resultant cavitation of the area vacated thereby, or to compensate for an increased flow through the orifice 373 in the piston 371 in the event of an increase in pressure. The action of this valve V–3 may not require the pumps P–1 and P–2 from changing their displacement, and under this condition flow from pump P–3 to reservoir HR is also utilized to supply fluid to the system to replace the volume of the rod 372 as above discussed.

If a slow movement of the piston 371 to the right is desired, a relatively small change of position of the piston 238 need be made, so as to decrease the amount of flow to the right hand side of the piston 371. Such a slow moving condition would cause the fluid to flow in a manner shown and described with reference to Figure 12. The movement of the piston 371 to the right under this latter condition is caused by the fact that the flow of fluid from the pumps to the right hand side thereof is less than that flowing through the orifice 373.

A rapid movement of work loading piston 371 to the right requiring additional fluid flow from pumps P–1 and P–2, the condition shown in Figure 14, requires the pumps P–1 and P–2 to first go to their zero displacement condition or to preselected low displacement condition and then to their operating displacement condition.

It should be pointed out here that, under certain conditions where the travel of the piston 371 is slight or at a slow rate, the spool-like member of the valve DC may move through operation of the monitoring valve and the discharge actuator DA to form an orifice with ports 265 and 266 to meter the flow from the right side of the cylinder 370 and although pumps P–1 and P–2 may change their displacement no power will be used (except as to overcome internal friction) because they are merely discharging into the left side of the cylinder 370 but exerting no force thereagainst. In addition, under these conditions pump P–3 will become active to operate the cylinder in the reservoir HR to replace the fluid in the system caused by the increase in volumetric capacity in the system by the rod 372 in the manner above discussed.

Figure 15 shows our system at a condition wherein the pumps P–1 and P–2 are at their zero displacement positions, and any flow therefrom is blocked from the right hand side of the piston 371. This condition is usually caused by the control loop indicating that a very slow and slight change in the position of the piston 371 is necessary to balance the system. Under this condition, the slide means S–1 and S–2 of the pumps P–1 and P–2 return under the influence of the springs 176 and 176', from any condition in which they may have been, to their zero displacement conditions, and the movement of the piston 371 is caused by the load continuing to cause a flow of fluid through the orifice 373. The check valve V–3 will be opened under this condition to supply fluid from the inlet to the left hand side of the piston 371 in a manner similar to that described in connection with Figure 14. Again, as for all of the conditions described, the work loading piston 371 will come to rest, after a slight overtravel, with an oscillation of decreasing amplitude.

We claim:

1. In a fluid control system, the combination of fluid pressure means including at least a first and a second pumping means, said second pumping means having a variable displacement, an actuator means including a movable piston means, first valve means for allowing a flow of fluid from said first fluid pumping means to said actuator means so as to act on said piston means and cause movement thereof, a movable control piston means, second valve means operatively connected to said actuator means for allowing a flow of fluid from said second pumping means to said control piston means, and means to vary the displacement of said second pumping means, said last-named means including means operated by said actuator means and being so constructed and arranged as to allow said second pumping means to pass through a preselected low displacement condition upon said actuator means being moved to its opposite extremes.

2. In a fluid control system, the combination of fluid pressure means including at least a first and a second pumping means, said pumping means each having an inlet and an outlet and comprising internal and external meshing gears, providing a plurality of isolated fluid pockets of diminishing volumes as they approach full meshing positions whereby to trap quantities of fluid therein, said second pumping means having a variable displacement, an actuator means including a movable piston means, first valve means for allowing a flow of fluid from said outlet of said first pumping means to said actuator means so as to act on said piston means and cause movement thereof, a movable control valve means operatively connected to said actuator means for allowing a flow of fluid from said outlet of said second pumping means to a control piston means, and means to vary the displacement of said second pumping means, said last named means including means associated with said gears and being so constructed and arranged as to vary the communication between said pockets and said outlet of said second pumping means.

3. In a fluid control system, the combination of fluid pressure means including at least a first and a second pumping means, said pumping means each having an inlet and an outlet and comprising internal and external meshing gears, providing a plurality of isolated fluid pockets of diminishing volumes as they approach full meshing positions whereby to trap quantities of fluid therein, said second pumping means having a variable displacement, an actuator means including a movable piston means, first valve means for allowing a flow of fluid from said outlet of said first pumping means to said actuator means so as to act on said piston means and cause movement thereof, a movable control valve means operatively connected to said actuator means for allowing a flow of fluid from said outlet of said second pumping means to a control piston means, and means to vary the displacement of said second pumping means, said last-named means being so constructed and arranged as to be movable relative to said gears and to communicate said pockets in advance thereof with said outlet and said pockets in the rear thereof with said inlet, and means operatively connecting said varying means with said actuator means.

References Cited in the file of this patent

UNITED STATES PATENTS

| | | |
|---|---|---|
| Re. 21,708 | Ernst | Feb. 4, 1941 |
| 1,943,061 | Douglas | Jan. 9, 1934 |
| 2,060,209 | Heckert | Nov. 10, 1936 |
| 2,094,526 | Carlson | Sept. 28, 1937 |
| 2,200,151 | Burkhardt | May 7, 1940 |
| 2,304,620 | Shaw | Dec. 8, 1942 |
| 2,552,604 | Thoma | May 15, 1951 |
| 2,656,846 | Anderson | Oct. 27, 1953 |
| 2,767,726 | Feucht | Oct. 23, 1956 |